United States Patent
Xhafa et al.

(10) Patent No.: US 8,670,345 B2
(45) Date of Patent: Mar. 11, 2014

(54) WIRELESS COEXISTENCE BASED ON NETWORK ALLOCATION VECTOR USAGE

(75) Inventors: Ariton E. Xhafa, Plano, TX (US);
Michael Glik, Kfar-Saba (IL); Ariela Blumer, Zofit (IL)

(73) Assignee: Texas Instruments Incorporated, Dallas, TX (US)

( * ) Notice: Subject to any disclaimer, the term of this patent is extended or adjusted under 35 U.S.C. 154(b) by 88 days.

(21) Appl. No.: 13/533,128

(22) Filed: Jun. 26, 2012

(65) Prior Publication Data
US 2013/0170478 A1    Jul. 4, 2013

Related U.S. Application Data

(60) Provisional application No. 61/501,431, filed on Jun. 27, 2011.

(51) Int. Cl.
*H04J 1/16* (2006.01)
*H04W 4/00* (2009.01)

(52) U.S. Cl.
USPC .......................................... 370/252; 370/338

(58) Field of Classification Search
USPC ................................................ 370/252, 338
See application file for complete search history.

(56) References Cited

U.S. PATENT DOCUMENTS

| 8,068,871 | B2 | 11/2011 | Xhafa et al. | |
|---|---|---|---|---|
| 2006/0140172 | A1* | 6/2006 | Trainin | 370/352 |
| 2007/0036074 | A1* | 2/2007 | Tsai et al. | 370/229 |
| 2009/0052426 | A1* | 2/2009 | Perraud | 370/338 |
| 2009/0285167 | A1* | 11/2009 | Hirsch et al. | 370/329 |
| 2010/0020773 | A1* | 1/2010 | Jechoux | 370/338 |
| 2011/0013608 | A1* | 1/2011 | Lee et al. | 370/338 |
| 2012/0207143 | A1* | 8/2012 | Banerjee et al. | 370/338 |
| 2012/0269181 | A1* | 10/2012 | Gonikberg et al. | 370/336 |

* cited by examiner

*Primary Examiner* — Andrew Lee
(74) *Attorney, Agent, or Firm* — Steven A. Shaw; Wade James Brady, III; Frederick J. Telecky, Jr.

(57) ABSTRACT

A wireless apparatus includes a wireless transceiver, a WLAN controller and a second controller coupled to the wireless transceiver. The WLAN controller is configured to send/receive packets in accordance with a WLAN protocol, and the second controller is configured to send/receive packets in accordance with a second wireless protocol. The apparatus includes scheduling logic that determines whether a WLAN communication will complete before an end of a WLAN active time period. If the scheduling logic determines that the WLAN communication will not complete before the end of the WLAN active time period, the scheduling logic causes the WLAN controller to transmit a WLAN packet that encodes a NAV value that prevents an access point from using the wireless medium until an end of second time period. The second controller is configured to use the wireless medium during the second time period.

15 Claims, 2 Drawing Sheets

WIRELESS COEXISTENCE BASED ON NETWORK ALLOCATION VECTOR USAGE

CROSS-REFERENCE TO RELATED APPLICATION

The present application claims priority to U.S. Provisional Patent Application No. 61/501,431 filed on Jun. 27, 2011 titled "Efficiency Increase Via Data Reservations," which is hereby incorporated by reference.

BACKGROUND

A variety of wireless protocols are available including, for example, the IEEE 802.11x family of protocols (wireless local area network, "WLAN"), Bluetooth, WiMAX, Wireless USB, etc. However, incorporating two or more wireless protocols in one device (e.g., smart phone, computer) may cause interference and saturation problems (referred to herein as a "coexistence" problem).

In some devices that implement multiple different wireless protocols (e.g., WLAN and Bluetooth), the disparate protocols are afforded access to the wireless medium at different times (time multiplexed use of the wireless medium). For example, while the WLAN protocol has access to the wireless medium, the Bluetooth protocol must wait, and vice versa.

SUMMARY

The problems noted above are solved in large part by a wireless apparatus that includes a wireless transceiver, a wireless local area network (WLAN) controller and a second controller coupled to the wireless transceiver. The WLAN controller is configured to send and receive packets in accordance with a WLAN protocol, and the second controller is configured to send and receive packets in accordance with a second wireless protocol. The apparatus also includes scheduling logic coupled to the WLAN and second controllers. The scheduling logic determines whether a WLAN communication will complete before an end of a WLAN active time period in which the WLAN controller has control over a wireless medium. If the scheduling logic determines that the WLAN communication will not complete before the end of the WLAN active time period, the scheduling logic causes the WLAN controller to transmit a WLAN packet that encodes a network allocation vector (NAV) value that prevents an access point from using the wireless medium until an end of second time period. The second controller is configured to use the wireless medium during the second time period.

In accordance with another embodiment, a method includes determining whether a WLAN communication will complete before an end of a WLAN active time period in which a WLAN controller has control over a wireless medium. The method also includes, based on determining that the WLAN communication will not complete before the end of the WLAN active time period, causing the WLAN controller to transmit a WLAN packet that encodes a network allocation vector (NAV) value that prevents an access point from using the wireless medium until an end of second time period.

BRIEF DESCRIPTION OF THE DRAWINGS

For a detailed description of exemplary embodiments of the invention, reference will now be made to the accompanying drawings in which.

NOTATION AND NOMENCLATURE

Figure 1:
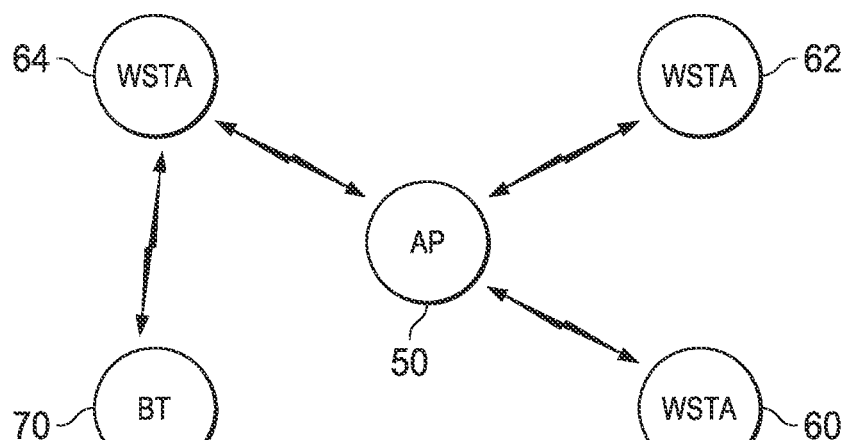
FIG. 1 shows a system with an access point, various wireless stations, and a Bluetooth device in accordance with illustrative embodiments.

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection, or through an indirect connection via other devices and connections.

The terms "packet" and "frame" are interchangeable.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

To avoid coexistence problems in which WLAN and another wireless technology operate in the same device, time multiplexed operation have been proposed. For example, in the case of WLAN and Bluetooth ("BT") coexistence, BT voice calls may take priority over other traffic flows in the WLAN. During the time periods that the device operates in the BT mode, the WLAN may operate in an unscheduled automatic power saving delivery (U-APSD) mode. During the time that the device operates in the WLAN mode, it sends a trigger frame (or a PS-Poll) to the access point ("AP") indicating that it is ready to receive packets. If the WLAN packets addressed to the device are sent within the time period that the device is operating in the BT mode, however, the device is not able to reply with an ACK (in case of immediate acknowledgment) or if the packets sent by the access point (AP) are not sent within the time interval that the device operates in the WLAN mode, a rate-fall back mechanism kicks in. This mechanism reduces the transmission rate used to send packets from the AP to the device; hence, the packets transmitted over the air occupy longer intervals, resulting in collisions with the use of the medium by the BT mode and performance deteriorates.

Alternatively, the device could send a Clear-to-Send-to-Self (CTS2Self) frame. The CTS2Self is a WLAN frame that instructs all other WLAN devices to avoid using the wireless medium for a period encoded in the CTS2Self frame itself. A WLAN device could send a CTS2Self frame to instruct other WLAN devices and access points from accessing the wireless medium during the BT mode. Doing so will avoid the rate-fall back mechanism that otherwise would be invoked by the access point. However, the use CTS2Self frames may silence neighboring/overlapping basic service sets (OBSSs) thereby reducing the overall performance of the network.

In accordance with the preferred embodiments, a communication device, that implements multiple wireless protocols, uses network vector allocation of data packets to facilitate coexistence of multiple wireless protocols, which in turn avoids the need to use CTS2Self frames. The following examples are related to a communication device that implements a WLAN protocol and the Bluetooth protocol. In other embodiments, other than WLAN and/or Bluetooth protocols may be used. The communication device may be referred to as a "combo device" in that the device combines multiple, disparate wireless protocols.

FIG. 1 shows a system that includes an access point (AP) 50 in wireless communication with wireless stations (WSTAs) 60, 62, and 64. One or more of the WSTAs preferably is a combo device and implements two wireless protocols such as WLAN (one of the IEEE 802.11x family of protocols) and Bluetooth. In the example of FIG. 1, WSTA 64 is illustrated as being configured to send and receive wireless communications to the AP 50 and also to send/receive wireless communications to/from BT device 70. Thus, WSTA 64 is a combo device and WSTAs 60 and 62 may also be combo devices. The system may include any number of APs, WSTAs and BT devices.

Figure 2:
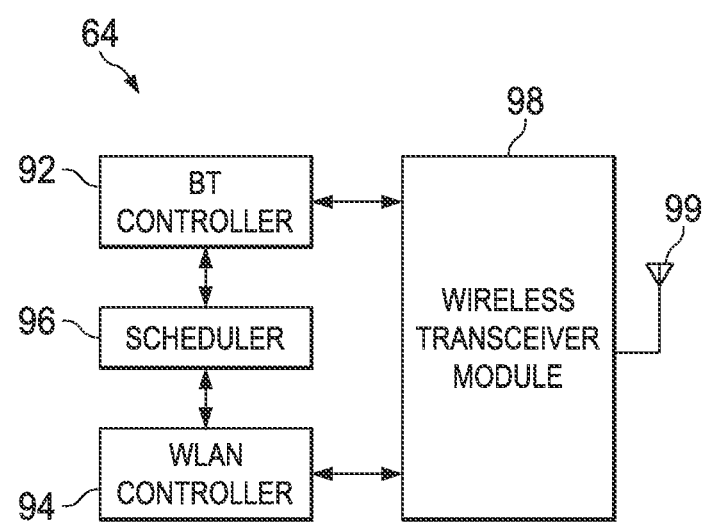
FIG. 2 shows a block diagram of a wireless station in accordance with various embodiments.

FIG. 2 illustrates an embodiment of a WSTA that implements multiple wireless protocols. As shown in the example of FIG. 2, the device includes two controllers 92 and 94, scheduling logic 96, a wireless transceiver module 98, and one or more antennas 99. Controller 92 is a BT controller and, as such, is configured to generate BT packets to be transmitted by the wireless transceiver module 98, and to receive and consume BT packets from the wireless transceiver module. Controller 94 is a WLAN controller and, as such, is configured to generate WLAN packets to be transmitted by the wireless transceiver module 98, and to receive and consume WLAN packets from the wireless transceiver module.

The AP 50 may be implemented with the same or similar architecture as shown in FIG. 2. Multiple wireless controllers or only a single wireless controller (WLAN) may be included in an AP as desired.

The scheduling logic 96 coordinates the activities of the BT and WLAN controllers 92, 94 as explained below. The coordination implemented by the scheduling logic 96 permits both the BT and WLAN wireless protocols to be implemented in the same device in an efficient manner. The scheduling logic 96 controls the WLAN controller 94 in such a way to avoid WLAN communications from interfering with BT communications without the use of CTS2Self packets.

Figure 3:
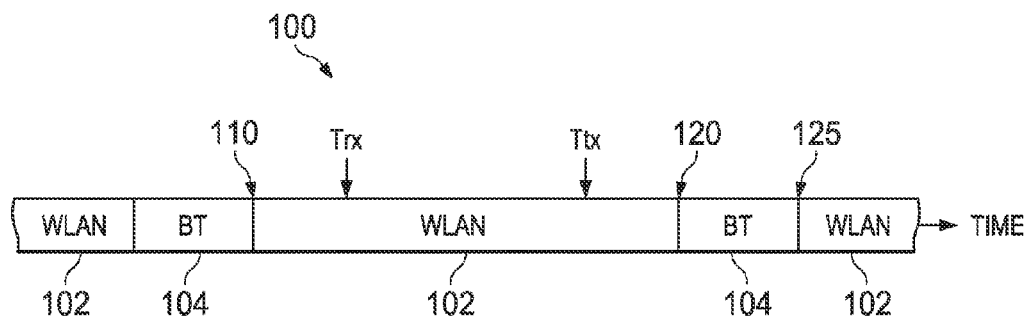
FIG. 3 illustrates a timeline in which different wireless protocols are granted access to the wireless medium in accordance with various embodiments.

FIG. 3 depicts a timeline 100 implemented on a combo device (e.g., WSTA 64). The illustrative timeline 100 includes alternating periods of time in which one wireless protocol or the other is granted access to the wireless medium. Timeline 100 shows alternating WLAN and BT time portions 102 and 104, respectively. During WLAN portion 102, only WLAN packets can be transmitted on the wireless medium, and the BT protocol is idle. Thus, during time portions 102, WLAN is active and BT is idle. Reference numeral 110 designates the beginning of the WLAN active time period 102. During time portions 104, the opposite is true—BT is active and WLAN is idle. Reference numeral 120 designates the end of the WLAN active period 102 and the beginning of the following BT active time period 104. The end of BT active period 104 is designated as 125. The scheduling logic 96 ensures that the BT and WLAN controllers 92, 94 comply with this requirement by coordinating when each controller is permitted access to the wireless medium. When the scheduling logic 96 has authorized the BT controller 92 to access the wireless medium, the device is said to be in the "BT mode," and when the WLAN controller is granted access to the wireless medium, the device is in the 'WLAN mode."

FIG. 3 also highlights one of the WLAN active periods 102 in particular. Two time periods are defined—a receive time period (Trx) and a transmit time period (Ttx). Trx is the time after which, if a WLAN communication is initiated by the access point, the WLAN communication will overlap the WSTA's Bluetooth mode of operation, for example, a reply from the WSTA will likely overlap the following BT active time period 104 for the combo device. The reply may be a WLAN medium access control (MAC) acknowledgement (Ack) frame. The Ttx time period is the time after which, if a packet is sent by a combo device, replying by the AP 50 with a WLAN MAC Ack frame will overlap with the ensuing BT mode of operation for the combo device.

Time periods Trx and Ttx may be in the order shown in FIG. 1 (Ttx after Trx) or in the opposite order (Ttx before Trx). Further still Trx and Ttx may be equal to each other (i.e., the same time value).

Trx may be an estimation based on packets received from the AP. For Ttx, the WLAN device knows exactly the length of the packets to be transmitted and can calculate Ttx accordingly (and accurately). For example, before a packet is to be transmitted, the length of the packet is known to the MAC; hence, based on the transmission rate to be used and on the reply packet length and rate (since it is a MAC Ack packet, length is defined and transmission rate is strictly tied to transmission rate of the packet transmitted by the combo device), Ttx can be easily and accurately calculated.

In accordance with the preferred embodiments of the invention, the scheduling logic 96 of a combo device determines whether a WLAN "communication" will complete before the end of a WLAN active time period 102 in which the WLAN controller has control over a wireless medium. The term "communication" means a frame exchange between nodes (preferably initiated by an access point) that may or may not be followed by an immediate response to the originally exchanged frame. The response could be an Ack frame, another frame, a block Ack, etc. A communication may include, for example, a data packet followed by an Ack frame, or a data packet only followed at a later time by a block Ack frame. In some cases, a communication does not include an Ack frame. If the scheduling logic determines that the WLAN communication will not complete before the end of the WLAN active time period, the scheduling logic causes the WLAN controller to transmit a WLAN packet that encodes a network allocation vector (NAV) value that prevents an access point from using the wireless medium until the end of the following BT active period 104, designated as 125 in FIG. 3. That is, if a combo device is to send a data packet to begin a WLAN communication and determines that the communication likely will not complete before he combo device's BT mode will begin, the combo device includes a sufficiently long NAV in the data packet to protect the BT mode from WLAN packets.

A NAV is a time value that is used by devices (e.g., AP 50) that receive combo device's data packet with the NAV value. The AP preferably inhibits its use of the wireless medium during time period indicated by the NAV value. The NAV value may be configured by the scheduling logic 96 and preferably is set long enough to avoid the AP 50 from using the wireless medium for the duration of the current active WLAN time period 102 and the following BT active time period 104. By effectively silencing the AP from using the wireless medium during the following BT active time period, the BT active periods are protected and collisions between WLAN and BT packets are avoided. Further, the rate-fall back mechanism of the AP is not implemented and OBSS's will likely not be able to decode the data packet and stay in silence.

Figure 4:
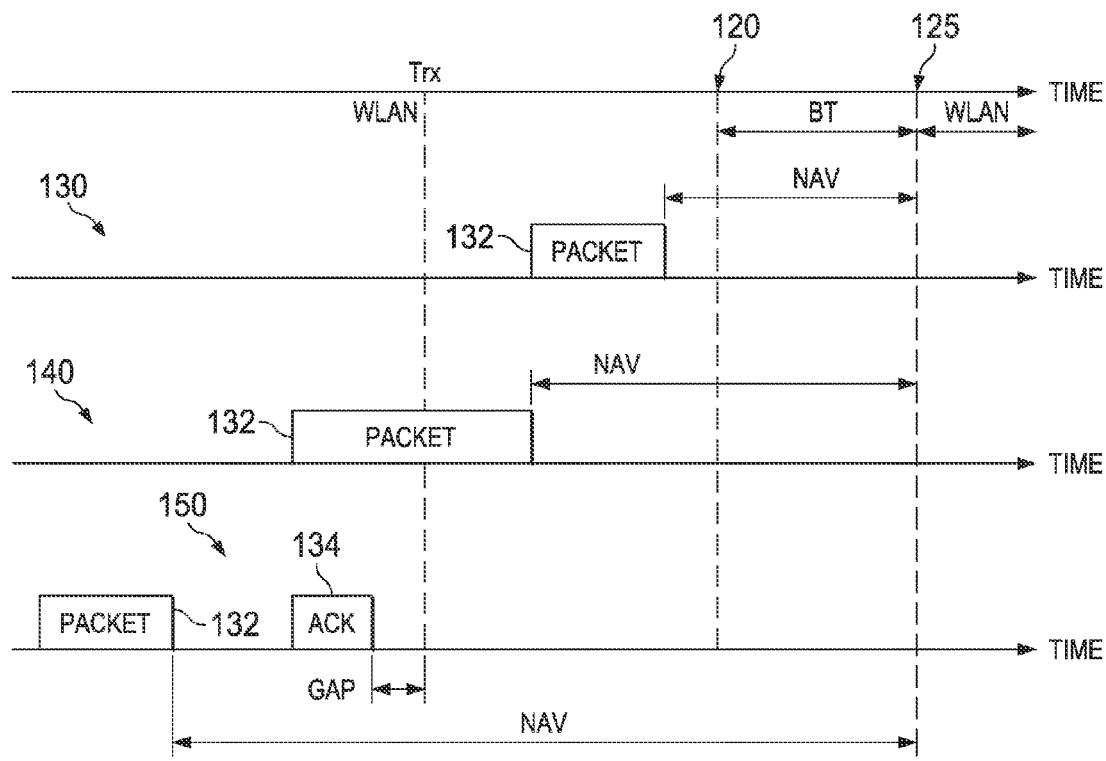
FIG. 4 illustrates various examples of how a NAV is implemented in certain conditions to protect a following Bluetooth active period.

The NAV value preferably is encoded in data packets from the combo devices if certain conditions are true as explained. The scheduling logic 96 determines whether the WLAN communication will complete before the end of the WLAN active time period by checking for the following conditions, which are illustrated in FIG. 4 as well.

For instance, the scheduling logic 96 determines whether a WLAN data packet from the combo device is going to be sent after the Trx time. If so, the scheduling logic causes the NAV value in that data packet to be set so as to protect the following BT active period from WLAN packets. This condition is depicted at 130 in FIG. 4 in which packet 132 is sent after Trx.

The scheduling logic 96 also determines whether a WLAN data packet from the combo device will begin prior to Trx but will not complete until after Trx. If so, the scheduling logic causes the NAV value in that data packet to be set so as to protect the following BT active period. This condition is depicted at 140 in FIG. 4 in which transmission of packet 132 by the combo device begins prior to Trx but completes after Trx.

The scheduling logic 96 also determines whether the end of a WLAN data packet sent from the combo device will occur before Trx. Reference numeral 150 in FIG. 4 illustrates packet 132 being transmitted in full before Trx. If the packet occurs before Trx, then the scheduling logic further determines whether the time interval between the end of the WLAN MAC Ack packet 134 expected from the AP and Trx is less than average backoff time of the AP. The time difference is designated in FIG. 4 as "GAP." If GAP is less than the AP's average backoff time, then the NAV in the data packet 132 sent from the combo node is set long enough to protect the following BT active period.

The AP's average backoff time can be estimated by the combo device based on the packets' access category received by the AP. Since different access categories have different contention windows, the average backoff time will be different and the combo node can use the average backoff time of the access category that AP is transmitting packets. Alternatively, the average backoff time can be measured by the combo device based on network statistics, as well as packet traffic and access category that AP is using to communicate with the combo node.

If none of the above conditions do not apply, then the NAV is not set by the combo device.

A further optimization is possible for Ttx whereby it is permissible for the WLAN MAC Ack frame to overlap with the following BT mode of operation as long as the preamble is received. In this case, reception of a preamble SIFS time after the packet is sent indicates that the received packet is very likely an Ack frame.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A wireless apparatus, comprising:
   a wireless transceiver;
   a wireless local area network (WLAN) controller coupled to the wireless transceiver, said WLAN controller configured to send and receive packets in accordance with a WLAN protocol;
   a second controller coupled to the wireless transceiver, the second controller configured to send and receive packets in accordance with a second wireless protocol; and
   scheduling logic coupled to the WLAN and second controllers, the scheduling logic determines whether a WLAN communication will complete before an end of a WLAN active time period in which the WLAN controller has control over a wireless medium, and if the scheduling logic determines that the WLAN communication will not complete before the end of the WLAN active time period, the scheduling logic causes the WLAN controller to transmit a WLAN packet that encodes a network allocation vector (NAV) value that prevents an access point from using the wireless medium until an end of second time period, the second controller configured to use the wireless medium during the second time period.

2. The wireless apparatus of claim 1 wherein the scheduling logic determines whether the WLAN communication will complete before an end of the WLAN active period by determining whether a WLAN packet will be sent by the WLAN controller after a receive time (Trx), said Trx being a time after which, if a WLAN communication is initiated by the access point, the WLAN communication overlap the second time period.

3. The wireless apparatus of claim 1 wherein the scheduling logic determines whether the WLAN communication will complete before an end of the WLAN active period by determining whether an end of a WLAN packet from the WLAN controller will occur after a receive time (Trx), said Trx being a time after which, if a WLAN communication is initiated by the access point, the WLAN communication overlap the second time period.

4. The wireless apparatus of claim 1 wherein the scheduling logic determines whether the WLAN communication will complete before an end of the WLAN active period by determining whether an end of a WLAN packet will occur before a receive time (Trx) and an end of an acknowledgment frame from the access point will be less than a predetermined time period of Trx, wherein Trx is a time after which, if a WLAN communication is initiated by the access point, the WLAN communication overlap the second time period.

5. The wireless apparatus of claim 4 wherein the predetermined time period is an average backoff time of the access point.

6. An apparatus, comprising:
   a wireless local area network (WLAN) controller configured to send and receive packets in accordance with a WLAN protocol;
   a second controller configured to send and receive packets in accordance with a second wireless protocol; and
   scheduling logic coupled to the WLAN and second controllers, the scheduling logic determines whether a WLAN communication will complete before an end of a WLAN active time period in which the WLAN controller has control over a wireless medium, and if the scheduling logic determines that the WLAN communication will not complete before the end of the WLAN active time period, the scheduling logic causes the WLAN controller to transmit a WLAN packet that encodes a network allocation vector (NAV) value that prevents an access point from using the wireless medium until an end of second time period, the second controller configured to use the wireless medium during the second time period.

7. The apparatus of claim 6 wherein the scheduling logic determines whether the WLAN communication will complete before an end of the WLAN active period by determining whether a WLAN packet will be sent by the WLAN controller after a receive time (Trx), said Trx being a time after which, if a WLAN communication is initiated by the access point, the WLAN communication overlap the second time period.

8. The apparatus of claim 6 wherein the scheduling logic determines whether the WLAN communication will complete before an end of the WLAN active period by determining whether an end of a WLAN packet from the WLAN controller will occur after a receive time (Trx), said Trx being a time after which, if a WLAN communication is initiated by the access point, the WLAN communication overlap the second time period.

9. The apparatus of claim 6 wherein the scheduling logic determines whether the WLAN communication will complete before an end of the WLAN active period by determining whether an end of a WLAN packet will occur before a receive time (Trx) and an end of an acknowledgment frame from the access point will be less than a predetermined time period of Trx, wherein Trx is a time period after which, if a WLAN communication is initiated by the access point, the WLAN communication overlap the second time period.

10. The apparatus of claim 9 wherein the predetermined time period is an average backoff time of the access point.

11. A method, comprising:
  determining whether a WLAN communication will complete before an end of a WLAN active time period in which a WLAN controller has control over a wireless medium; and
  based on determining that the WLAN communication will not complete before the end of the WLAN active time period, causing the WLAN controller to transmit a WLAN packet that encodes a network allocation vector (NAV) value that prevents an access point from using the wireless medium until an end of second time period.

12. The method of claim 11 wherein determining whether the WLAN communication will complete before an end of the WLAN active period comprises determining whether a WLAN packet will be sent by the WLAN controller after a receive time (Trx), said Trx being a time after which, if a packet is sent by the access point, an acknowledgement frame from the WLAN controller will overlap the second time period.

13. The method of claim 11 wherein determining whether the WLAN communication will complete before an end of the WLAN active period comprises determining whether an end of a WLAN packet from the WLAN controller will occur after a receive time (Trx), said Trx being a time after which, if a WLAN communication is initiated by the access point, the WLAN communication overlap the second time period.

14. The method of claim 11 wherein determining whether the WLAN communication will complete before an end of the WLAN active period comprises determining whether an end of a WLAN packet will occur before a receive time (Trx) and an end of an acknowledgment frame from the access point will be less than a predetermined time period of Trx, wherein Trx is a time period in which, if a WLAN communication is initiated by the access point, the WLAN communication overlap the second time period.

15. The method of claim 14 wherein determining the predetermined time period comprises determining an average backoff time of the access point.

* * * * *